Patented July 28, 1936

2,049,311

UNITED STATES PATENT OFFICE 2,049,311

ADHESIVES AND METHOD OF MAKING THE SAME

George H. Osgood and Russell G. Peterson, Tacoma, Wash.

No Drawing. Application November 3, 1933, Serial No. 696,545

6 Claims. (Cl. 134—23.5)

Our invention relates to glues for use, especially, in the manufacture of veneer panels, and has special reference to glues as set forth in our pending application for patent filed under Serial Number 652,692, in which we have described glues made from the hulls or the pods of single seeds, such as pea hulls, pea pods, bean hulls, bean pods, vetch hulls, vetch pods, cottonseed hulls and date pits. Besides the above materials, other seed hulls may be used to make good vegetable glue bases, among which may be mentioned coffee parchment for which material we have also filed application for patent.

We have now discovered that, though all of these materials will produce good adhesive bases alone, each has its own peculiar characteristics. We have found that while cottonseed hulls make the strongest glue in this group, it takes such a long time to dry in the panel that it slows up the process of manufacturing the panels; and that while a glue made of pea or bean hulls dries very quickly, it has less strength than the cottonseed hull glue. Also, we have found that by blending the cottonseed hulls with the pea or bean hulls, for instance, and submitting the meal to proper treatment, we are able to produce a glue which retains the strength of the cottonseed hull glue while it dries a great deal faster through the effect of the presence of the pea or bean hulls therein, thus making the resulting glue commercially practical. Also we have found that, for some unknown reason, coffee parchment and some few other seed hulls, though making very good adhesives by themselves, foam very badly, but by blending them with cottonseed hulls this trouble is overcome.

The hulls to be used are first dried and ground to a suitable mesh and are then blended in the proportions desired to attain the required quality or characteristic of the glue; then this blended material is treated with caustic soda, in order to swell and mercerize the hulls; and then the mass is subjected to carbon bisulphide fumes to form the hemicellulose content thereof into sodium memmicellulose zanthogenate and the fiber or cellulose content into sodium cellulose zanthogenate with the caustic soda, which combination causes the hulls to dissolve. The treatment with the fumes of carbon bisulphide is maintained for four or five hours. The mass is then diluted with water to the glue consistency desired. The grinding of the hulls is not a necessity but we prefer to reduce the hulls to pass through 10 to 25 mesh in order to speed up the reaction.

Since cottonseed hulls make the strongest bond and are very cheap and easy to obtain we prefer to use this material as the predominant element of the various blends, of which the following are given as examples:—

(1) Cottonseed hulls _____ 75
    Pea hulls _____ 25
(2) Cottonseed hulls _____ 75
    Bean hulls _____ 25
(3) Cottonseed hulls _____ 65
    Coffee parchment _____ 15
    Pea hulls _____ 20
(4) Cottonseed hulls _____ 70
    Coffee parchment _____ 20
    Pea hulls _____ 10
(5) Cottonseed hulls _____ 70
    Coffee parchment _____ 15
    Bean hulls _____ 15

The above blends are examples only and we do not wish to be limited either to the given proportions of the said blends nor to the materials used in the blends, as many other hulls may be used and the blends may be made in any desired proportions.

Having described our invention, what we claim and desire to secure by Letters Patent is:—

1. An adhesive base composition consisting in a xanthogenized mixture of two or more kinds of seed hulls.

2. An adhesive base composition consisting in a xanthogenized mixture of cottonseed hulls and one or more other kinds of seed hulls.

3. The process of making an adhesive base composition consisting in blending two or more kinds of seed hulls, and treating the same with caustic soda and with carbon bisulphide.

4. The process of making an adhesive base composition consisting in blending cottonseed hulls with one or more other kinds of seed hulls, and treating the same with caustic soda and with carbon bisulphide.

5. The process of making an adhesive base composition consisting in blending two or more kinds of seed hulls, and treating the same with caustic soda and with a sulphur derivative of carbonic acid.

6. The process of making an adhesive base composition consisting in blending cottonseed hulls with one or more other kinds of seed hulls, and treating the same with caustic soda and with a sulphur derivative of carbonic acid.

GEORGE H. OSGOOD.
RUSSELL G. PETERSON.